US007024156B2

(12) United States Patent
Kawamata et al.

(10) Patent No.: US 7,024,156 B2
(45) Date of Patent: Apr. 4, 2006

(54) INFORMATION DISTRIBUTING METHOD, INFORMATION RECEIVING METHOD, INFORMATION DISTRIBUTION SYSTEM, INFORMATION DISTRIBUTION APPARATUS, RECEPTION TERMINAL AND STORAGE MEDIUM

(75) Inventors: Yukihiro Kawamata, Hitachi (JP); Kimiya Yamaashi, Hitachi (JP); Takaharu Ishida, Hitachinaka (JP); Osamu Tomobe, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 496 days.

(21) Appl. No.: 09/793,971

(22) Filed: Feb. 28, 2001

(65) Prior Publication Data

US 2002/0025777 A1 Feb. 28, 2002

(30) Foreign Application Priority Data

Aug. 31, 2000 (JP) ............................ 2000-263484

(51) Int. Cl.
*H04H 1/00* (2006.01)

(52) U.S. Cl. .................. 455/3.02; 455/414.4; 455/419; 455/9; 370/349; 370/394; 370/474

(58) Field of Classification Search ................ 370/349, 370/394, 473, 474, 471, 472, 410; 455/3.02, 455/3.01, 2.01, 3.05, 9, 11.1, 414.1, 414.3, 455/414.4, 418, 416, 428, 12.1, 13.1, 419
See application file for complete search history.

(56) References Cited

U.S. PATENT DOCUMENTS 4,617,657 A * 10/1986 Drynan et al. .............. 370/394
5,163,055 A * 11/1992 Lee et al. .................. 714/748
5,875,292 A * 2/1999 Taketsugu ................... 370/474
6,608,841 B1 * 8/2003 Koodli ....................... 370/474
6,621,796 B1 * 9/2003 Miklos ....................... 370/236
6,816,471 B1 * 11/2004 Ludwig et al. ............. 370/331

FOREIGN PATENT DOCUMENTS

JP 09-091186 4/1997
JP 11-032311 2/1999
JP 11-136651 5/1999
JP 11-238021 8/1999
JP 11-250145 9/1999

* cited by examiner

*Primary Examiner*—Tilahun Gesesse
*Assistant Examiner*—John J. Lee
(74) *Attorney, Agent, or Firm*—Mattingly, Stanger, Malur & Brundidge, P.C.

(57) ABSTRACT

A broadcast content that is at least a part of an original content is broadcasted, and a differential content, which is at least a part of the original content, is transmitted in response to a request from a reception terminal. The differential content and the broadcast content are merged with each other to reproduce a perfect original content. Therefore, the perfect original content can be obtained at low price and in short time even when the original content contains a large amount of data.

13 Claims, 16 Drawing Sheets

EDITED MUSIC CONTENT PACKET

INFORMATION DISTRIBUTING METHOD, INFORMATION RECEIVING METHOD, INFORMATION DISTRIBUTION SYSTEM, INFORMATION DISTRIBUTION APPARATUS, RECEPTION TERMINAL AND STORAGE MEDIUM

This application is based on Japanese Patent Application No. 2000-263484 filed in Japan on Aug. 31, 2000, the contents of which are incorporated hereinto by reference.

BACKGROUND OF THE INVENTION

1. Field of the Invention

The present invention relates to a content distribution based on digital broadcasting such as ground-wave digital broadcast, satellite digital broadcast or the like.

2. Description of the Related Art

Broadcasting or distribution of music contents by using a broadcast network based on a digital broadcasting satellite or the like, or a communication network based on a cellular phone or the like have been recently proposed or put into practice by various enterprises, etc.

In general, the digital broadcast supports one-to-multiple communications, and it can transmit data having a large data size to many users at the same time. Therefore, particularly when a large amount of data such as a music content or the like is distributed, a broadcast infrastructure is more effectively used, from the viewpoint of the communication cost and the communication speed, than when a communication infrastructure such as a cellular phone or the like is used.

The broadcast infrastructure has no re-transmitting function. Therefore, once a user temporarily fails to obtain some data (hereinafter referred to as "missing part") due to instantaneous interruption while the user receives the data on the move (hereinafter referred to as "reception on the move"), the user cannot resume the data thus lost. Further, since the broadcast is carried out according to a predetermined program schedule, the content has been usually edited in advance and thus in many cases it is different from the original. Therefore, in many cases, some pieces of data are missing from the content obtained through a broadcast network or some differences exist between the content thus obtained and the original. Therefore, it is difficult to obtain the data having the perfect content.

On the other hand, a data re-transmission request is easy in a communication infrastructure such as a cellular phone, PHS (Personal Handy Phone System) or the like. However, the communication cost is very high and the communication speed is low because it supports one-to-one communications. Therefore, this communication infrastructure is unsuitable for the distribution of data having a large data size such as a music content, from the viewpoint of the communication cost and the communication time.

SUMMARY OF THE INVENTION

An object of the present invention is to provide an information distribution method, an information reception method, an information distribution system, a distribution apparatus and a reception terminal which can obtain a perfect content at a low cost and in short time even when a large amount of data is contained in the content.

In order to attain the above object, according to the present invention, there is provided an information distribution method for broadcasting a broadcast content which is at least a part of an original content, and for transmitting, in response to a request from a reception terminal, a differential content which is at least a part of an original content. The perfect original content can be reproduced by merging the differential content with the broadcast content.

The present invention may be applied to the distribution of any digital content such as a music content, map data, a computer application, game software, picture/video/image software, education/teaching materials/book software, text information, etc., and it is particularly suitable for the distribution of a music content having a large data size.

Further, according to the present invention, there is provided an information reception method for receiving through a broadcast from a content distributing station a broadcast content which is at least a part of an original content, detecting a missing portion or a missing/altered portion due to editing in the broadcast content thus received, requesting the content distributing station to transmit the missing/altered portion concerned, receiving a differential content corresponding to the missing/altered portion which is at least a part of the original content transmitted in response to the request concerned, and merging the broadcast content with the differential content to reproduce the original content.

Still further, according to the present invention, there are provided an information distribution system, an information distribution apparatus and a reception terminal which use the information distribution method or the information reception method as described above, and an information recording medium which holds programs for implementing the above methods and from which data can be mechanically read.

According to the present invention, even a content containing a large amount of data can be perfectly obtained at a low cost and in short time. According to the present invention, data which is missing (lost) through digital broadcast can be obtained through a digital communication, and thus even when an instantaneous interruption occurs due to data reception on the move in the digital broadcast, a user can listen to the broadcast without interruption. Further, since only a missing part (differential part) of the content is obtained through the digital communication, the communication cost and the communication time can be greatly reduced.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Figure 1:
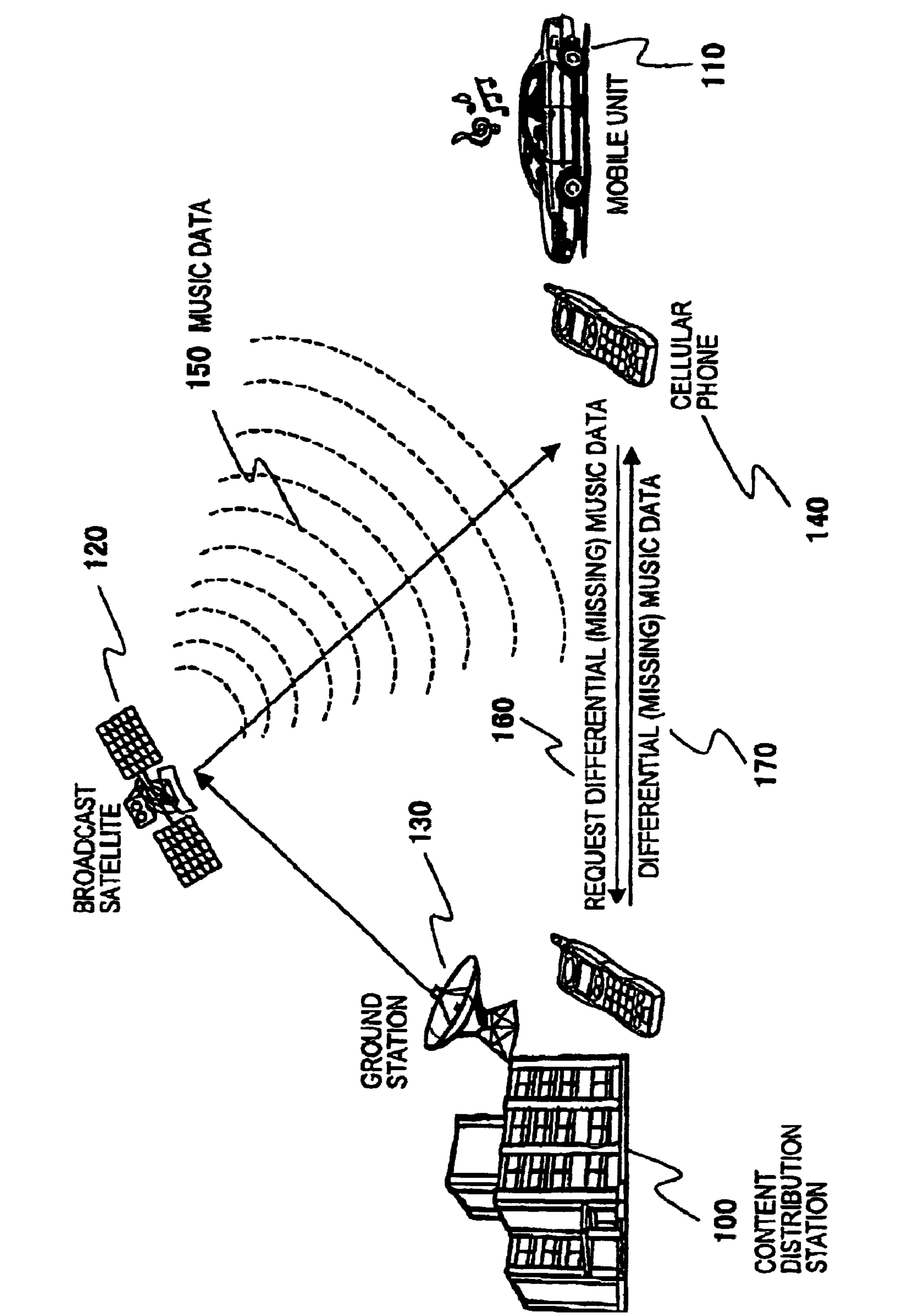
FIG. 1 is a schematic diagram showing a first embodiment of the present invention.

In an information distribution system according to the present invention, a broadcast content which is at least a part of an original content is broadcasted by an information distributing apparatus, and a differential content which is at least a part of the original content is transmitted in response to a request from a reception terminal.

It is preferable that each of the broadcast content and the differential content contains at least one of packets which are obtained by dividing the original content, each packet being assigned a serial code (a packet identifying code such as a number, a symbol or the like) corresponding to a time sequence. Further, it is also preferable that no serial code is added to each packet that contains different data from the original content due to editing or the like. Accordingly, the time sequence of the packets can be easily recognized by detecting a discontinuous portion of the codes, and a missing/altered portion, etc. can be rapidly detected. Further, it is preferable that the broadcast content and the differential content are based on the same format in order to facilitate the merge processing.

Further, according to the present invention, there are provided: (1) an information distribution apparatus including a broadcast unit for broadcasting a broadcast content which is at least a part of an original content, and a data communication unit for transmitting a differential content which is at least a part of the original content in response to a request from the external such as a reception terminal or the like; (2) a reception terminal including a broadcast reception unit for receiving a broadcast content which is at least a part of the original content through a broadcast from the information distribution apparatus, a lacking portion identifying unit for detecting a missing portion, or a missing portion or an altered portion due to editing in the broadcast content thus received, a differential packet request unit for requesting the information distribution apparatus to transmit the missing portion or the alteration portion, a data communication unit for receiving the differential content corresponding to the missing or the altered portion which is transmitted in response to the request and is at least a part of the original content, and a content merging unit for merging the broadcast content with the differential content to reproduce the original content; and (3) an information distribution system equipped with the information distribution apparatus and the reception terminal of the present invention.

It is preferable that when the broadcast content is broadcasted, the information distribution apparatus distributes content information containing the packet identifying codes of the first packet and the last packet in the packets constituting the broadcast content concerned. This makes it easy to identify the missing portion of the packets of the broadcast content, etc.

The reception terminal preferably includes at least any one of a purchase button for accepting a purchase request of the received content during the reproduction of the content concerned, a broadcast data buffer for holding the received broadcast content for a predetermined time, a merge permission managing unit for permitting the merging of the content, and means for recording the reproduced original content in a recording medium.

PREFERRED EMBODIMENTS

First Embodiment

A first embodiment of the present invention will be described with reference to FIGS. 1 to 7.

The first embodiment is directed to an example of a reception terminal for a mobile unit, a data distribution method and a data distribution system in which when music data (content) is distributed to a mobile unit through a digital broadcast such as a ground-wave digital broadcast, a satellite digital broadcast for mobile units or the like, a missing part of the music data which a user failed to take due to an instantaneous interruption of the broadcast or the like is obtained by using a digital communication network such as a cellular phone network or the like, and then the content obtained through the digital broadcast and the missing part of the content due to the instantaneous interruption or the like, having been obtained through the communication network, are merged into the perfect content. That is, the reception terminal of this embodiment comprises means for buffering the data of the music content received through the digital broadcast for a fixed period of time, obtaining, during this fixed period of time, the data of a missing part of the music content which the user failed to take due to an instantaneous interruption of the broadcast or the like (hereinafter referred to as "differential content") through a communication network such as a cellular phone or the like, and then merging the music data thus buffered and the differential content thus obtained with each other, whereby the music content can be reproduced continuously.

According to this embodiment, both advantages, i.e., the advantage of the broadcast infrastructure that a large amount of data can be distributed at a low cost and the advantage of the communication infrastructure that the data re-transmission request is possible, are combined with each other, and thus a perfect music content can be surely obtained at a low cost even when the music content is received on the move.

Figure 7:
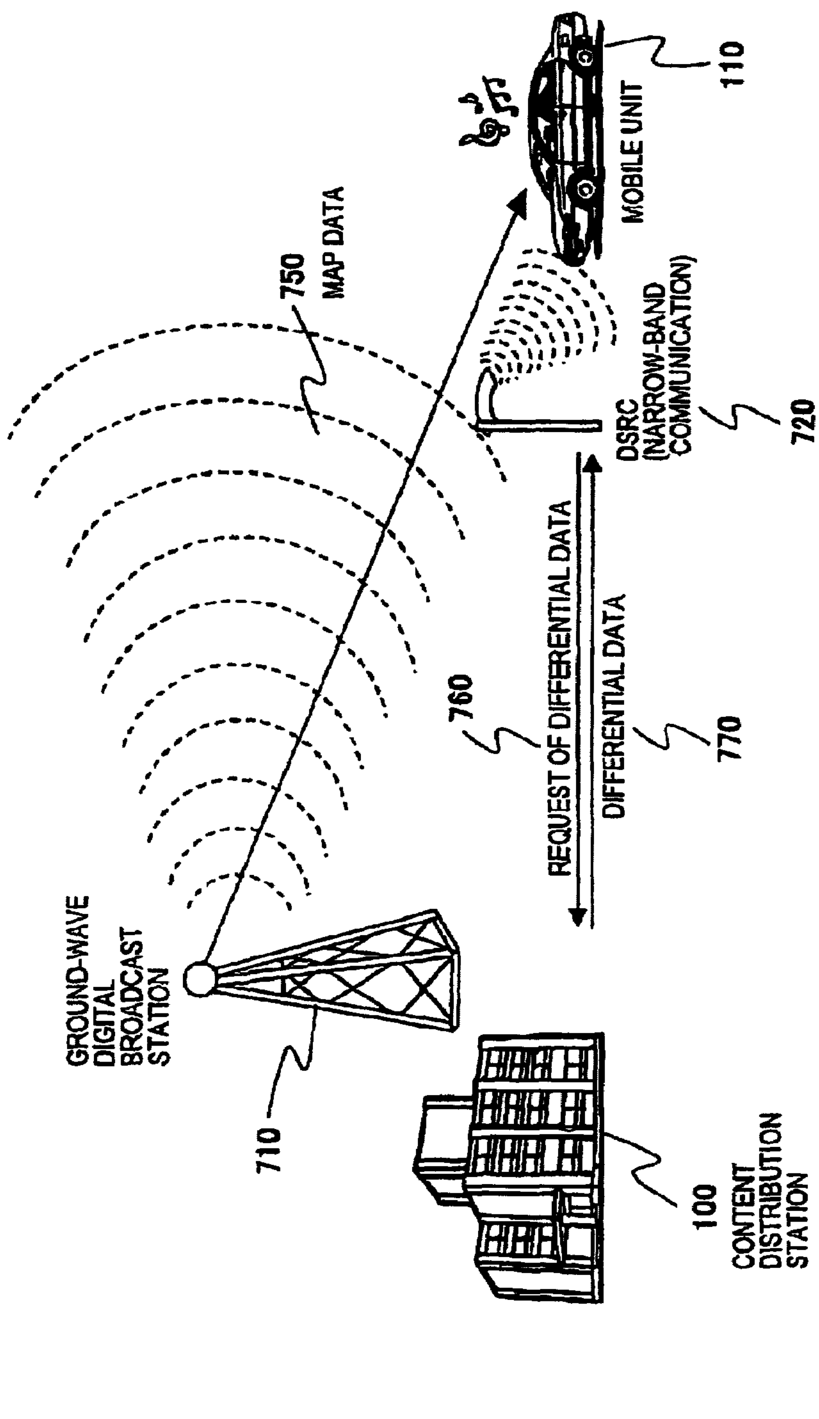
FIG. 7 is a distribution system diagram using the first embodiment, a ground-wave digital broadcast network of the first embodiment and DSRC.

The content to be distributed in this embodiment is not limited to music data, and it may be video data for television receivers, text information broadcast such as character broadcast or the like, or image data such as computer graphics. Further, it may be map data 750 as shown in FIG. 7. That is, the present invention may be applied to obtain map data, and a differential map data request 760 and a differential map data transmission/reception 770 may be carried out.

In this embodiment, the satellite broadcast is used as the digital broadcast network. In this case, an oblong-orbiting satellite is more suitably used for data reception of mobile unit, because it is less influenced even behind a building or the like. Further, music data to be distributed through the digital broadcast network may be distributed from a ground-wave digital broadcast station 710 as shown in FIG. 7.

Further, in this embodiment, the cellular phone network is used as the communication network. However, the differential content may be obtained by using DSRC 720 which is a narrow-band communication system for ITS (Intelligent Transport System) as shown in FIG. 7. Besides, communication infrastructures such as PHS, HDR (High Data Rate), next-generation cellular phone IMT 2000, etc. may be used.

(1) System Construction

FIG. 1 schematically shows an information distribution system according to the first embodiment of the present invention. The information distribution system of this embodiment includes a content distributing station (information distribution apparatus) 100 from which a music content 150 is distributed and a missing (lacking) part (data) which the user failed to take during the data reception on the move is supplied in response to a request from a reception terminal side, a broadcast satellite 120 for broadcasting the music content from the content distributing station 100 to a mobile unit 110, a ground station 130 for transmitting the music content data to the broadcast satellite 120, and a cellular phone 140 for making the request 160 from the mobile unit 110 for the missing part of the music content, that is, a lacking portion of the music content, and for receiving a differential content 170 transmitted from the content distributing station in response to the request 160 as to the lacking portion of the music content.

Figure 2:
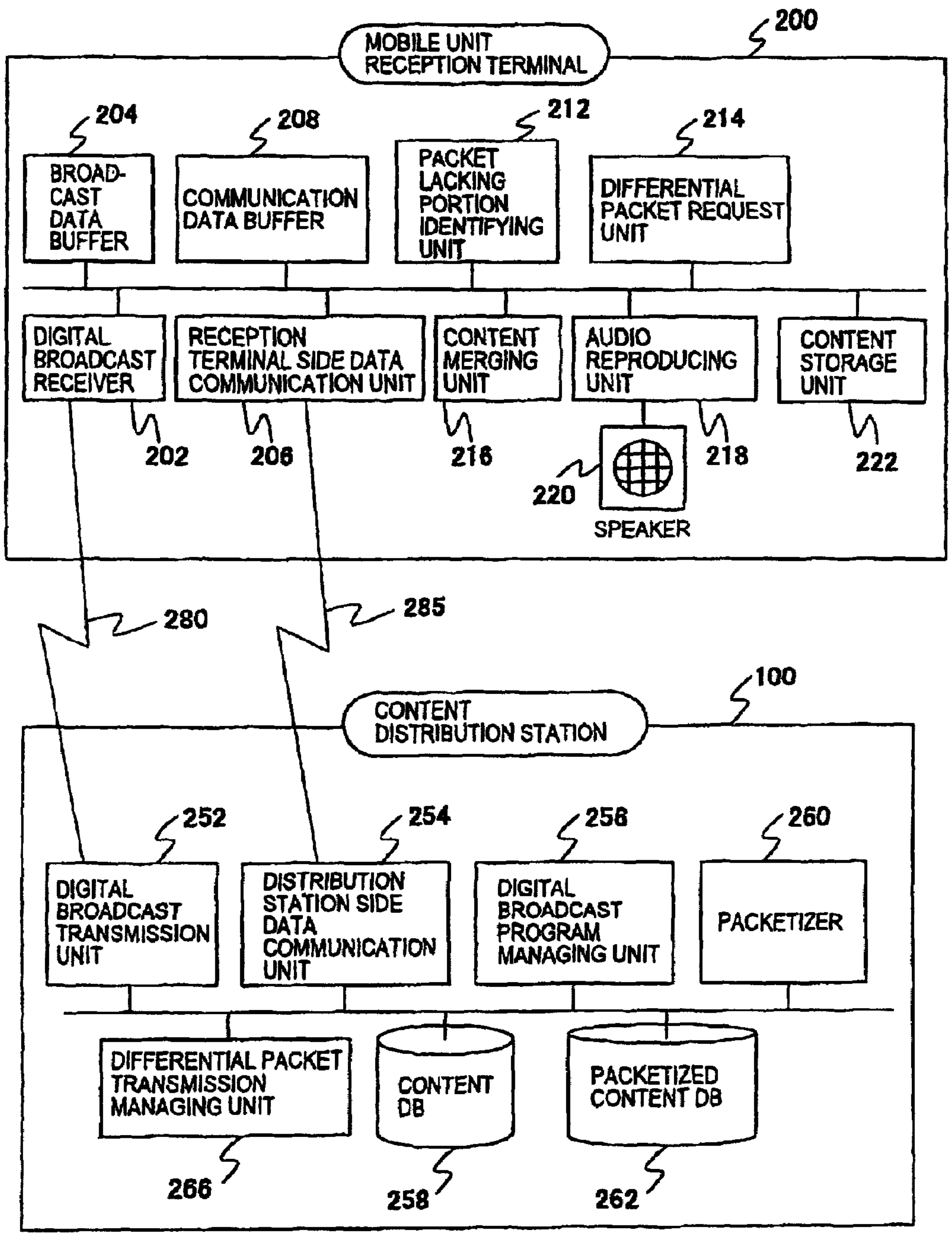
FIG. 2 is a system diagram showing the first embodiment of the present invention.

FIG. 2 shows a system construction of this embodiment. This system includes a mobile unit reception terminal 200 mounted on the mobile unit 110 and the content distributing station 100, and there are provided between the mobile unit reception terminal 200, and the content distributing station 100 a digital broadcast network 280 through which a music content or data are distributed to the mobile unit reception terminal 200 and a cellular phone communication network 285 through which a missing part of a music content is requested to the content distributing station 100 to allow the mobile unit reception terminal 200 to obtain the data of the missing part of the music content. The digital broadcast network 280 may be a broadcast satellite 120, particularly an oblong-orbiting satellite broadcast suitable for mobile unit broadcast, and ground-wave digital broadcast.

In this embodiment, the music data distributed through the digital broadcast network 280 and the music data of the missing part communicated through the cellular phone communication network 285 are transmitted on a packet basis. Each packet is obtained by dividing the music data into plural slender parts, and sequential serial numbers are allocated to the respective packets thus obtained.

(2) Mobile Unit Reception Terminal

First, the system construction of the mobile unit reception terminal 200 will be described. The mobile unit reception terminal 200 includes a digital broadcast receiver 202 for receiving music data from the content distributing station 100 through the digital broadcast network 280, a broadcast data buffer 204 for temporarily storing the music data received by the digital broadcast receiver 202, a reception terminal side data communication unit 206 for requesting the content distributing station 100 to transmit the differential content of a missing part which a user failed to take due to an instantaneous interruption and for receiving the differential content transmitted from the content distributing station 100 in response to the request, a communication data buffer 208 for temporarily storing the differential content received by the reception terminal side data communication unit 206, a packet lacking portion identifying unit 212 for identifying reception-failed music packets on the basis of a series of the serial numbers of the music packets, the differential packet request unit 214 for requesting the packets of a differential content to compensate for the lacking portion identified by the packet lacking portion identifying unit 212, a content merging unit 216 for merging the music content temporarily stored in the broadcast data buffer 204 and the differential content temporarily stored in the communication data buffer 208 to restore a perfect music content, an audio reproducing unit 218 for reproducing the music content restored by the content merging unit 216, a speaker 220 for outputting music reproduced by the audio reproducing unit 218, and a content storage unit 222 for holding the perfect music content.

Figure 4:
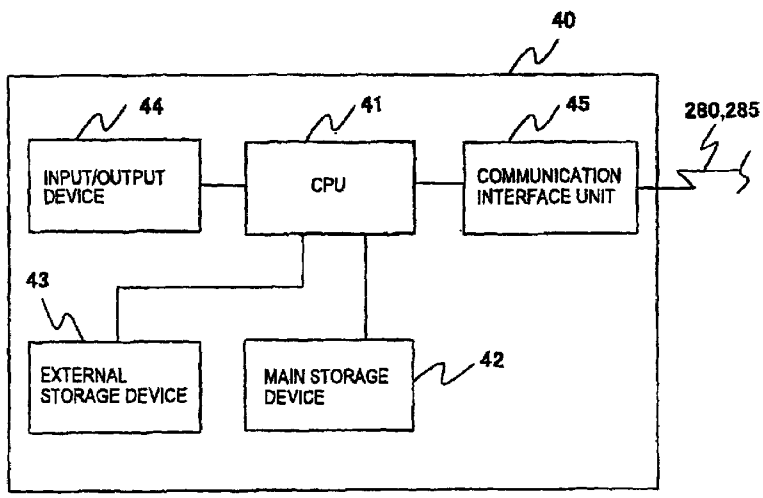
FIG. 4 is a hardware diagram showing a construction of an information processor.

As shown in FIG. 4, the mobile unit reception terminal 200 is an information processor 40 including an external storage device 43, a main storage device 42, a central processing unit (CPU) 41, a communication interface unit 45 and an input/output device 44. The speaker 220 constitutes a part of the input/output device 44.

Some storage areas in the external storage device 43 are allocated for each buffer 204, 208 and the content storage unit 222. The storage area exclusively used for the content storage unit 222 may be omitted by sharing either the storage area for the broadcast data buffer 204 or the communication data buffer 208. Further, the content storage unit 222 may be allocated to a temporary storage area.

Each of the processing units 202, 206, 212, 214, 216, 218 is implemented by allowing CPU 41 to execute programs, which are stored in the external storage device 43 in advance and read out from the main storage device 42 as required. In the present invention, each processing unit is implemented by software, however, the present invention is not limited to this embodiment. For example, each processing unit may be implemented by a custom hardware containing a hard-wared logic or the like.

In this embodiment, the communication of the reception terminal side data communication unit 206 is carried out through the cellular phone 140. The cellular phone 140 and the information processor 40 are connected to each other through a digital communication line. Further, in this embodiment, the reception of the digital broadcast reception unit 202 is carried out through a radio (not shown) mounted on the mobile unit 110. The radio and the information processor 40 are connected to each other through a digital communication line. However, the present invention is not limited to the system using a general reception/transmission device. For example, a special-purpose device may be used for any one or both of the data communication and the digital broadcast reception, being self-contained or externally. Alternatively, reception/transmission device supporting both the data communication and digital broadcasting reception functions may be used.

(3) Content Distributing Station

Next, the system construction of the content distributing station 100 serving as the distribution apparatus will be described. The content distributing station 100 comprises a digital broadcast transmission unit 252 for distributing a music content, a distributing station side data communication unit 254 for receiving the request of a differential content from the mobile unit reception terminal 200 and transmitting the differential content to the mobile unit reception terminal 200, a digital broadcast program managing unit 256 for carrying out a management processing so that the music content can be distributed according to a predetermined program schedule, a content data base (DB) 258 in which music contents are accumulated, a packetizer 260 for packetizing the content data of the content DB 258, a packetized content DB 262 for accumulating the music data packetized by the packetizer 260, and a differential packet transmission managing unit 266 for managing the transmission of the packets of the differential content corresponding to the request of the differential content from the mobile unit reception terminal 200.

As shown in FIG. 4, the content distributing station 100 is the information processor 40 including the external storage device 43, the main storage device 42, CPU 41, the communication interface unit 45 and the input/output device 44. Some storage areas in the external storage device 43 are allocated for each DB 258 and 262. Each of the processing units 252, 254, 256, 260 and 266 is implemented by allowing CPU 41 to execute programs that are stored in the external storage device 43 in advance and read out from the main storage device 42 as required. The transmission of the broadcast and the data communication are carried out through the interface unit 44 by the satellite broadcast ground station 130, the cellular phone base station, etc.

In the present invention, each processing unit is implemented by software. However, the present invention is not limited to this mode, and it may be implemented by a custom hardware containing hard-wared logic, etc.

In this embodiment, both of the digital broadcast and the communication to cellular phones are carried out by the content distributing station 100. However, the present invention is not limited to this mode, and the broadcast station and the communication station may be separately provided.

(4) Flow of Processing

Figure 3:
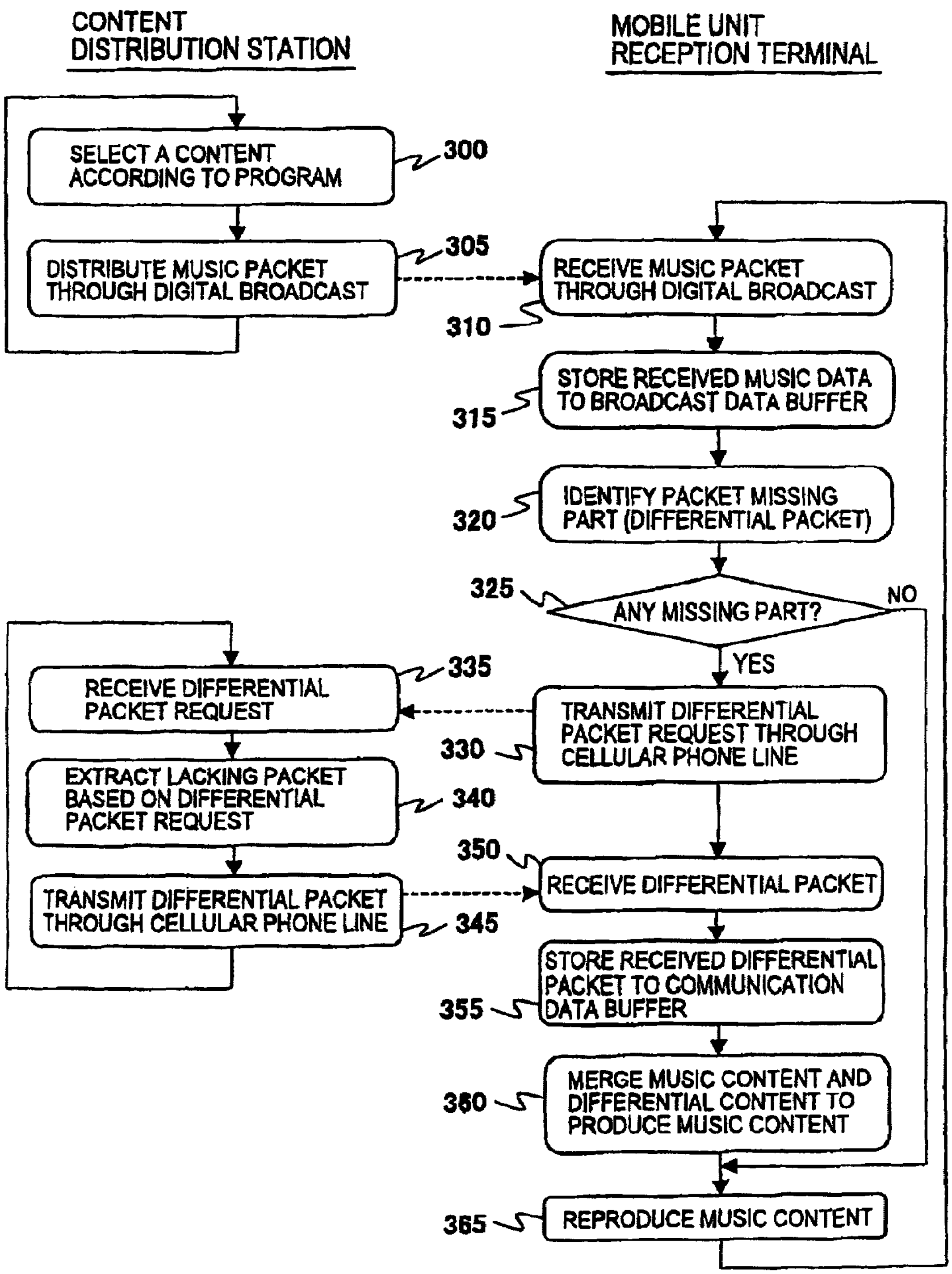
FIG. 3 is a flowchart showing a processing of the first embodiment of the present invention.

Next, the flow of the processing of the system according to this embodiment will be described with reference to the flowchart of FIG. 3.

First, the processing from step 300 until step 305 corresponds to the processing of distributing music data from the content distributing station 100 through the digital broadcast network 280.

First, the digital broadcast program managing unit 256 selects a content to be distributed from the content DB 258 by a broadcast time, according to a program table scheduled in advance, and packetized the selected content by the packetizer 260 to create music packets. Further, the packetized music content is accumulated in the packetized content DB 262 (step 300).

Figure 5:
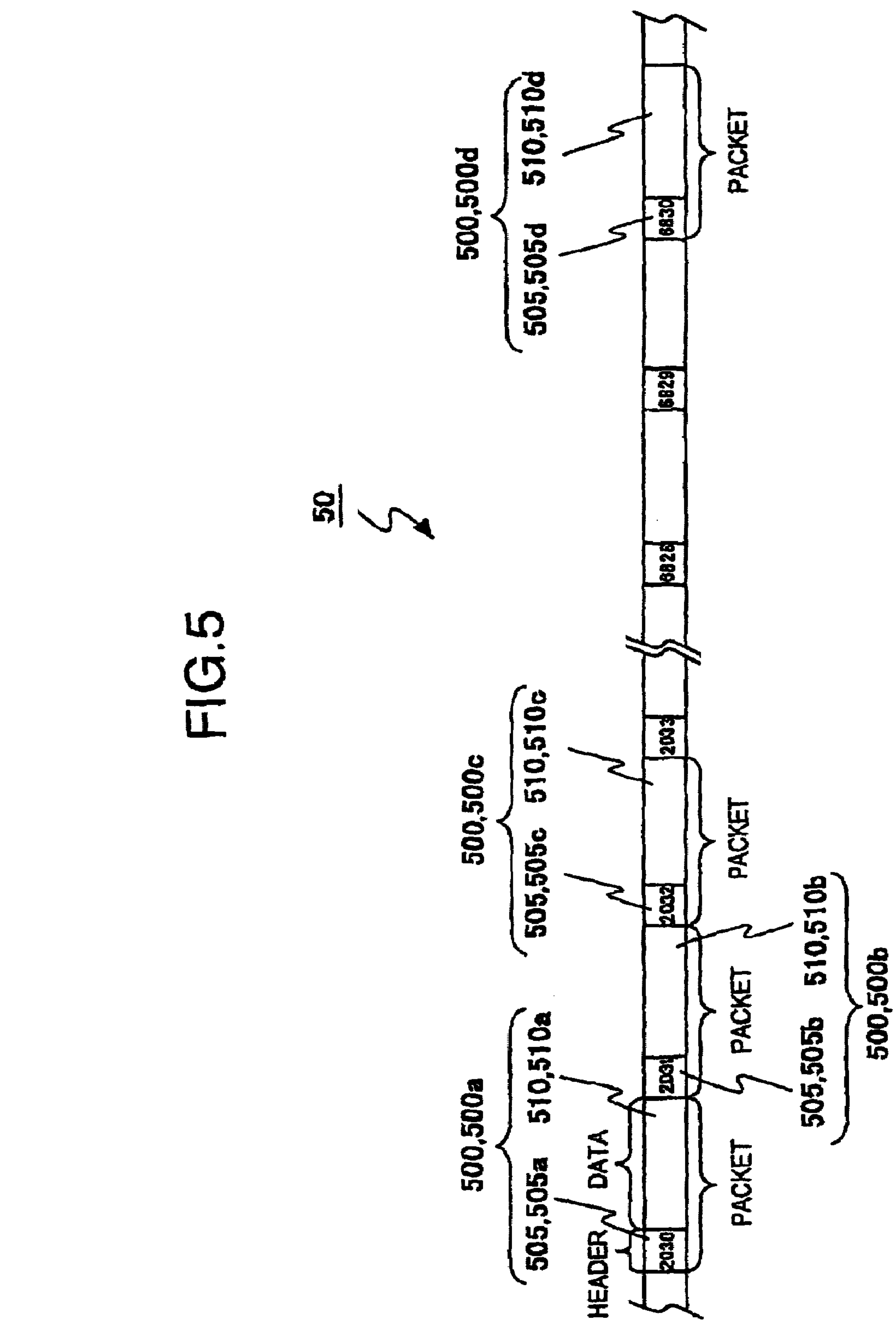
FIG. 5 shows a music packet of the first embodiment of the present invention.

Here, the music packet will be described. The packet is a lump of data obtained by dividing the content into small pieces. For example, FIG. 5 shows that music content data 50 is divided into small pieces of data at a fixed size. Each packet 500 comprises a header 505 and data 510. A unique packet number is described at each of the header units 505*a* to 505*d* of the respective packets 500*a* to 500*d*. Further, a fixed size of music data, having been divided into a small piece, is inserted in each of the data portions 510*a* to 510*d*.

In the case of FIG. 5, the music content data 50 is inserted in the data 510*a* of the packet 500*a* serving as the first packet 500, the data 510*b* of the second packet 500*b*, the data 510*c* of the third packet 500*c*, . . . and the data 510*d* of the packet 500*d* serving as the last packet 500 in this order. Packet numbers are serially allocated, e.g., a packet number "2030" being described in the header 505*a* of the head packet 500*a*, a packet number "2031" in the header 505*b* of the second packet 500*b*, and a packet number "2032" in the header 505*c* of the third packet 500*c*, and if a user fails to take any of the packets, it is known which packet is missing.

Subsequently, the digital broadcast program managing unit 256 picks up a music packet created in step 300 from the packetized content DB 262 on the basis of the program table when the broadcast time for the music packet comes, and transmits the music packet from the digital broadcast transmission unit 252 through the digital broadcast network 280 (step 305).

The processing from step 310 to step 315 corresponds to the reception processing of data from the digital broadcast network 280 in the mobile unit reception terminal 200. In this processing, the digital broadcast reception unit 202 receives the music data (music packet) distributed by the digital broadcast network 280 (step 310), and temporarily stores the music data (music packet) thus received into the broadcast data buffer 204 (step 315).

The processing from step 320 to step 330 corresponds to the identification processing of the missing part of the music packet and the request processing to the content distributing station 100, in the mobile unit reception terminal 200. First, on the basis of the packet numbers described in the headers of the packets, the packet lacking portion identifying unit 212 detects a place (differential packet) at which the packet numbers are not serial (step 320). In the case of FIG. 5, if the mobile unit reception terminal 200 fails to take the packet 500*b* (i.e., the packet 500*b* is a missing packet), the packet 500*c* is received subsequently to the packet 500*a*, and thus the packet number "2030" described in the header unit 505*a* of the packet 500*a* and the packet number "2033" described in the header unit 505*c* of the packet 500 are not serial to each other. By detecting these packet numbers that are not serial to each other, the packet lacking portion identifying unit 212 detects the packet number of the missing packet.

Subsequently, if there is no missing packet, the mobile unit reception terminal 200 stores the content data held in the broadcast data buffer 204 into the content storage unit 222, and then proceeds the processing to step 365 to reproduce the music content (step 325).

If there is any missing packet, the mobile unit reception terminal 200 advances the processing to step 330 (step 325). In step 330, the differential packet request unit 214 transmits the packet number of the differential packet detected in step 320 from the reception terminal side data communication unit 206 through the cellular phone communication network 285 to the content distributing station 100.

The processing from step 335 to step 345 corresponds to the processing in the content distributing station 100 for supplying the differential packet in response to the reception request of the differential packet from the mobile unit reception terminal. First, the distributing station side data communication unit 254 receives the differential packet number transmitted through the cellular phone communication network 285 (step 335), the differential packet transmission managing unit 266 extracts the packet of the packet number received from the packetized content DB 262 (step 340), and the distributing station side data communication unit 254 transmits the extracted packet through the cellular phone communication network 285 to the mobile unit reception terminal 200 (step 345).

The processing from step 350 to step 365 corresponds to the processing of merging the differential music packet obtained from the content distributing station 100 through the cellular phone communication network 285 and the music packet received through the digital broadcast with each other, and the processing of reproducing the content thus merged. If the differential music packet transmitted in step 345 is received by the reception terminal side data communication unit 206 (step 350), the reception terminal side data communication unit 206 temporarily stores the differential music packet thus received into the communication data buffer 208 (step 355). Subsequently, the music packet which is temporarily stored in the broadcast data buffer 204 and the differential music packet which is temporarily stored in the communication data buffer 208 are merged with each other by the content merging unit 216, to store into the content storage unit 222 (step 360). The merge processing is carried out by linking the music packet of the broadcast data buffer 204 and the music packet of the communication data buffer 208 so that the packet numbers at the header portions of the packets are serial to each other.

Figure 6:
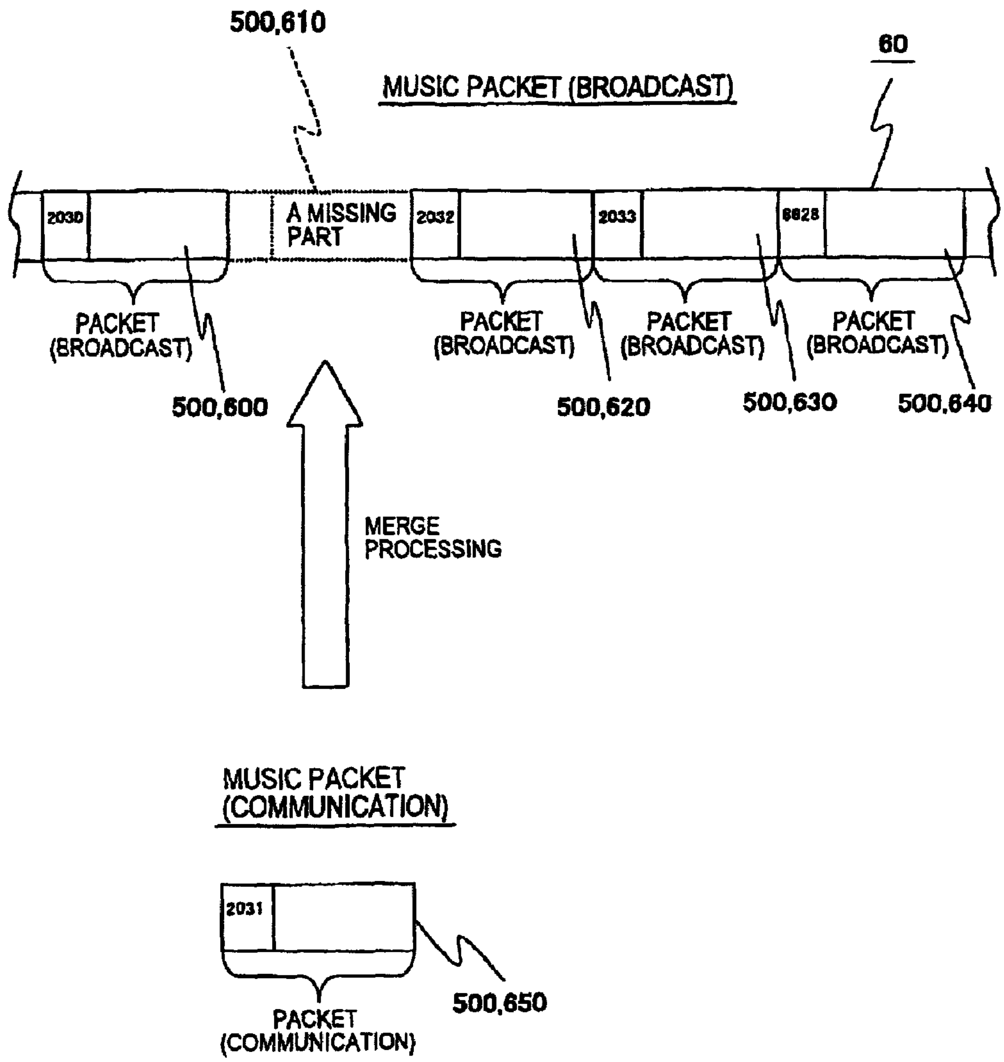
FIG. 6 is a diagram showing a merge processing of data missing part of the first embodiment and a second embodiment of the present invention.

Here, the merge processing will be described with reference to FIG. 6. In the case of FIG. 6, music packets 600, 620, 630, 640 are contained in the music content data 60 received through the digital broadcast, and the packet 610 is missing from the received music packets and thus it is not received. The packet 650 having the same content as the missing packet 610 is obtained through the cellular phone communication network. According to the merge processing in step 360, the packet 650 (differential packet) obtained through the cellular phone communication network is inserted into the place between the packet 600 and the packet 620 at which the missing packet 610 should have been originally located, thereby reproducing the perfect content.

The perfect content is obtained through the above processing. Therefore, the audio reproducing unit 218 finally reproduces the music content held in the content storage unit 222 to output music from the speaker 220.

With the above processing, even when an instantaneous interruption occurs while a digital broadcast is received on the move, the user can listen to the broadcast without interruption.

Second Embodiment

Next, a second embodiment will be described with reference to FIGS. 8 to 16. In this embodiment, music contents distributed through the music broadcast are sold.

In general, the music contents distributed through the music broadcast are subjected to various editing such as cut, fade-in, fade-out, etc. to meet a program schedule, and thus in many cases, these music contents are usually different from the original music contents. Therefore, according to this embodiment, in order to supply an original non-edited music content by using the music content distributed through the broadcast, a non-edited portion (a part of the original music content) of the music content distributed through the broadcast is temporarily stored, and the differential content corresponding to the portion which is different from the original or missing due to editing of the music content is obtained through a communication infrastructure such as a cellular phone or the like, and then the non-edited portion thus stored and the differential content thus obtained are merged with each other to supply a perfect original music content.

Therefore, according to this embodiment, as compared with the case where the overall perfect content is supplied through a communication network, the communication cost can be remarkably reduced and the down-load time of music contents can be overwhelmingly shortened due to the advantage of the digital broadcast in which the communication speed is high. Further, as in the case of the first embodiment, the missing part due to the reception on the move is supplied through the communication network, and thus the perfect music content having no defect can be supplied even when the digital broadcast is received on the move.

In this embodiment, the distribution target is defined as music content. However, as in the case of the first embodiment, this embodiment may be applied to the distribution of video data for televisions or the like, text information based on character broadcast, data broadcast of computer graphics, maps, etc. in the same way.

Further, in this embodiment, as in the case of the first embodiment, the satellite broadcast is used as the digital broadcast network. However, an oblong-orbiting satellite is more suitably used for data reception of mobile unit because it is less influenced even behind a building or the like. Further, the digital broadcast network may be a ground-wave digital broadcast. Still further, in this embodiment, the cellular phone network is used as the communication network, however, communication infrastructures such as DSRC, PHS, HDR, etc. may be used.

(1) System Construction

Figure 8:
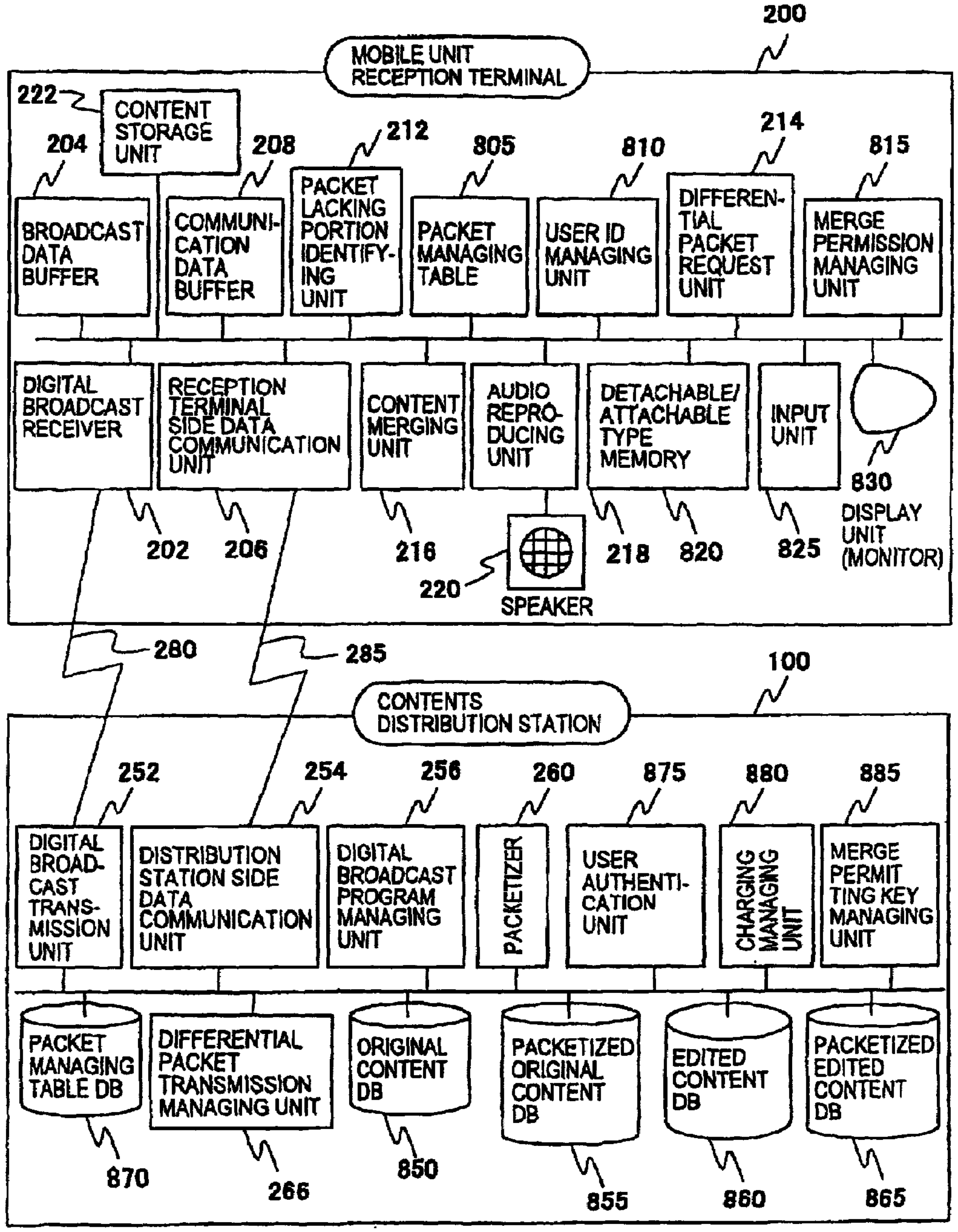
FIG. 8 is a system diagram showing the second embodiment of the present invention.

FIG. 8 shows the system construction of this embodiment. The system of this embodiment includes a mobile unit reception terminal 200 mounted on the mobile unit 110 and a content distributing station 100. Further, between the mobile unit reception terminal 200 and the content distributing station 100 are provided a digital broadcast network 280 for distributing music or data to the mobile unit reception terminal 200, and a cellular phone communication network 285 for requesting the content distributing station 100 to transmit a portion which is different from an original music content or lacks, or a portion which the user fails to take due to an instantaneous interruption in the data reception on the move, and for obtaining a differential content which is missing or lacking due to editing and which are required to restore the original music in the mobile unit reception terminal 200.

The digital broadcast network 280 is, for example, a network of a broadcast satellite 120, and particularly it is preferable a network of the oblong-orbiting satellite broadcast optimum to the mobile unit broadcast or of the ground-wave digital broadcast. The music content distributed from the digital broadcast network 280 and the differential content communicated through the cellular phone communication network 285 are transmitted in a form of packets obtained by dividing the music data into small pieces as in the case of the first embodiment. The construction of the packets is the same as in the first embodiment, and sequential serial numbers are allocated to these packets, respectively.

(2) Mobile Unit Reception Terminal

As in the case of the first embodiment, the mobile unit reception terminal 200 includes a digital broadcast receiving unit 202 for receiving music data from the content distributing station 100 through the digital broadcast network 280, a broadcast data buffer 204 for temporarily storing the music data received by the digital broadcast receiving unit 202, a reception terminal side data communication unit 206 for requesting to the content distributing station 100 the differential content of a portion which is different from the original or which a user failed to take (i.e., missing portion), and for receiving the differential content transmitted from the content distributing station 100 in response to the request, a communication data buffer 208 for temporarily storing the differential content received by the reception terminal side data communication unit 206, a packet lacking portion identifying unit 212 for identifying the missing packets on the basis of a series of serial numbers allocated to the packets, a differential packet request unit 214 for requesting the packets of the differential content identified by the packet lacking portion identifying unit 212, a content merging unit 216 for merging the music content temporarily stored in the broadcast data buffer 204 and the differential content (music data which is lacking due to a failure of taking data or editing) temporarily stored in the communication data buffer 208 to restore a perfect music content, an audio reproducing unit 218 for reproducing the data of the music content restored by the content merging unit 216, a content storage unit 222 for holding the perfect music content, and a speaker 220 for outputting music reproduced by the audio reproducing portion 218.

Further, the mobile unit reception terminal 200 of this embodiment includes a packet managing table 805 in which the head and last packet numbers and the content ID as information required to restore the content of a piece of music are described, a user ID managing unit 810 for storing user ID (identifier) information required when a music content is purchased, a merge permission managing unit 815 for permitting the merging processing of music packets obtained through the digital broadcast network and the digital communication network, a storage device 820 for recording the merged content, an input unit 825 for accepting inputs of a request to purchase, etc., and a display unit 830 for displaying a download status and a purchase processing status when the music content is purchased. The storage device 820 of this embodiment can read/write information from/into a storage medium that is detachably/attachably mounted on the storage device 820. Further, the input unit 825 contains a touch sensor equipped on the display screen of the display unit 830.

(3) Content Distributing Station

The content distributing station 100 includes a digital broadcast transmission unit 252 for distributing a music content, a distributing station side data communication unit 254 for accepting a request of differential content from the mobile unit reception terminal 200 and transmitting the differential content to the mobile unit reception terminal 200, a digital broadcast program managing unit 256 for managing to distribute the music content according to a predetermined program schedule, an original content DB 850 for accumulating original music contents before editing, an edited content DB 860 for accumulating music contents having been edited for broadcast, a packetizer 260 for packetizing the original music contents of the original content DB 850 and the edited music contents of the edited content DB 860, a packetized original content DB 855 for accumulating the original music contents packetized by the packetizer 260, a packetized edited content DB 865 for accumulating the edited music contents for broadcast, a packet managing table DB 870 for holding/managing the packet managing table in which the head and last packet numbers for one content of the music packets accumulated in the packetized original content DB 855 and the content ID for specifying the content are described, a differential packet transmission managing unit 266 for managing the transmission of the packets of the differential content corresponding to the differential content request from the mobile unit reception terminal 200, a user authentication unit 875 for performing user authentication when a content is purchased, a charging management unit 880 for performing the charging processing in response to a content purchasing request from the mobile unit reception terminal 200, and a merge permission key managing unit 885 for managing a merge permitting key needed for the merge processing.

As shown in FIG. 4, the content distributing station 100 corresponds to the information processor 40 is the external storage device 43, the main storage device 42, CPU 41, the communication interface portion 45 and the input/output device 44. Some storage areas in the external storage device 43 are allocated fro each DB 870, 850, 855, 560 and 865. Further, CPU 41 executes programs that are stored in the external storage device 43 in advance and read into the main storage device 42 as required to thereby implement each of the processing portions 252, 254, 256, 260, 266, 875, 880 and 885. The transmission of broadcast and the data communication are carried out through the interface portion 44 by the satellite broadcast ground station 130, the cellular phone base station or the like.

In the present invention, each processing portion is implemented by software as described above. However, the present invention is not limited to this mode, and each processing portion may be implemented by a custom hardware containing hard-wared logic.

Further, in this embodiment, the content distributing station 100 carries out both the digital broadcast and the communication to the cellular phone. However, the present invention is not limited to this mode, and the broadcast station and the communication station may be separately arranged.

(4) Flow of Processing

Figure 9:
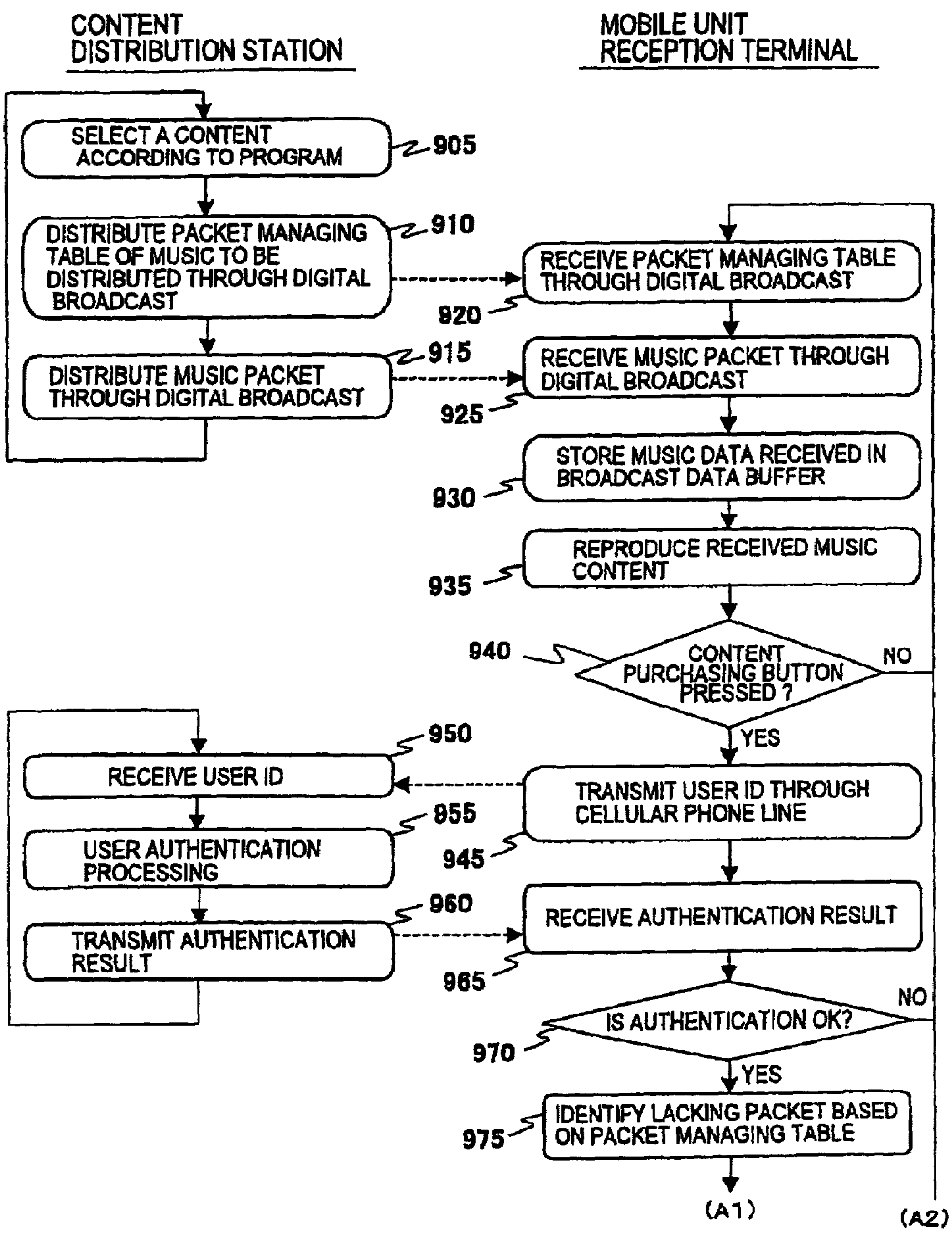
FIG. 9 is a flowchart showing the second embodiment of the present invention.
Figure 10:
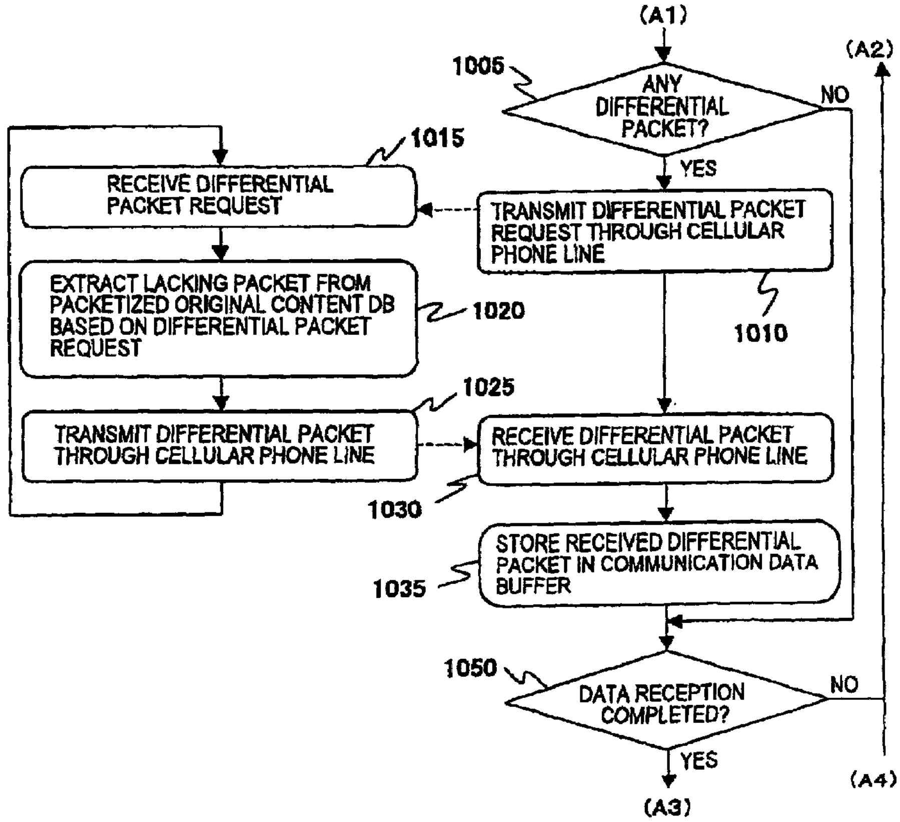
FIG. 10 is a flowchart showing the second embodiment of the present invention.
Figure 11:
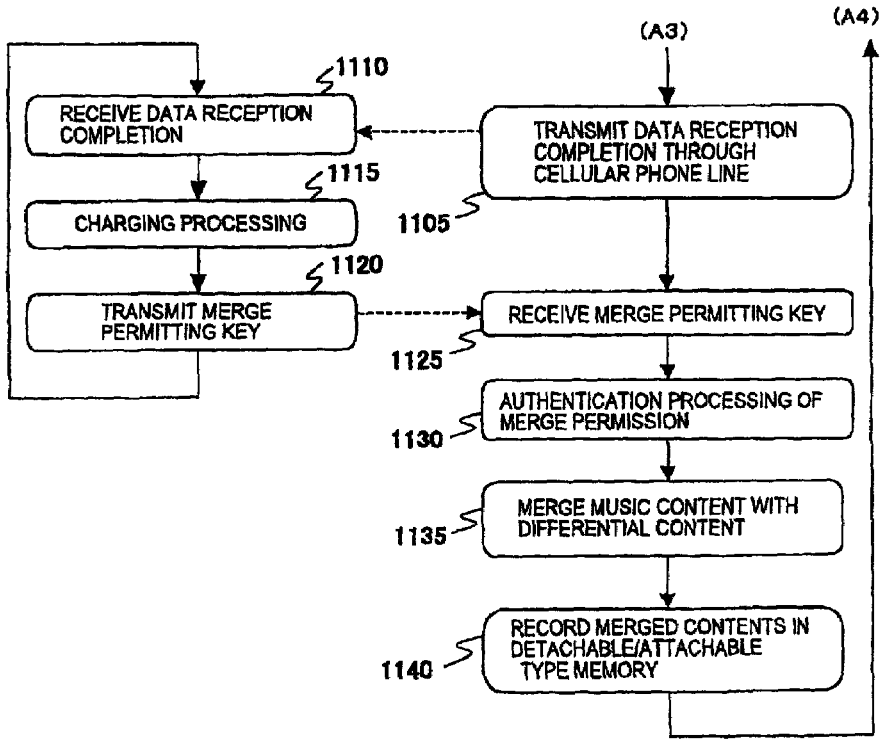
FIG. 11 is a flowchart showing the second embodiment of the present invention.

Next, the flow of the processing in the system of this embodiment will be described with reference to the flowcharts of FIGS. 9 to 11.

The processing from step 905 to step 915 corresponds to the processing of distributing music data by using the digital broadcast network 280 in the content distributing station 100.

First, the digital broadcast program managing unit 256 extracts an original version and an edited version for a content to be distributed from the original content DB 850 and the edited content DB 860 according to a predetermined scheduled program table (step 905). The processing of the step 905 is set to be finished before the broadcast starting time.

In step 905, the original music content extracted from the original content DB 850 and the edited music content extracted from the edited content DB 860 are packetized by the packetizer 260. In the packetizing processing, serial numbers are allocated to the packets of the original content, and the same packet numbers as the original content are allocated to non-edited packets in the packets of the edited content while "null" is allocated as the packet number of packets which have been subjected to the editing processing in the edited content. Further, the packetizer 260 creates a packet managing table in which the head and last packet numbers of the music packets accumulated in the packetized original content DB 855 and the content ID of the content packetized in the packetizer 260 are described, and records the packet managing table thus created into the packet managing table DB 870.

Figure 12:
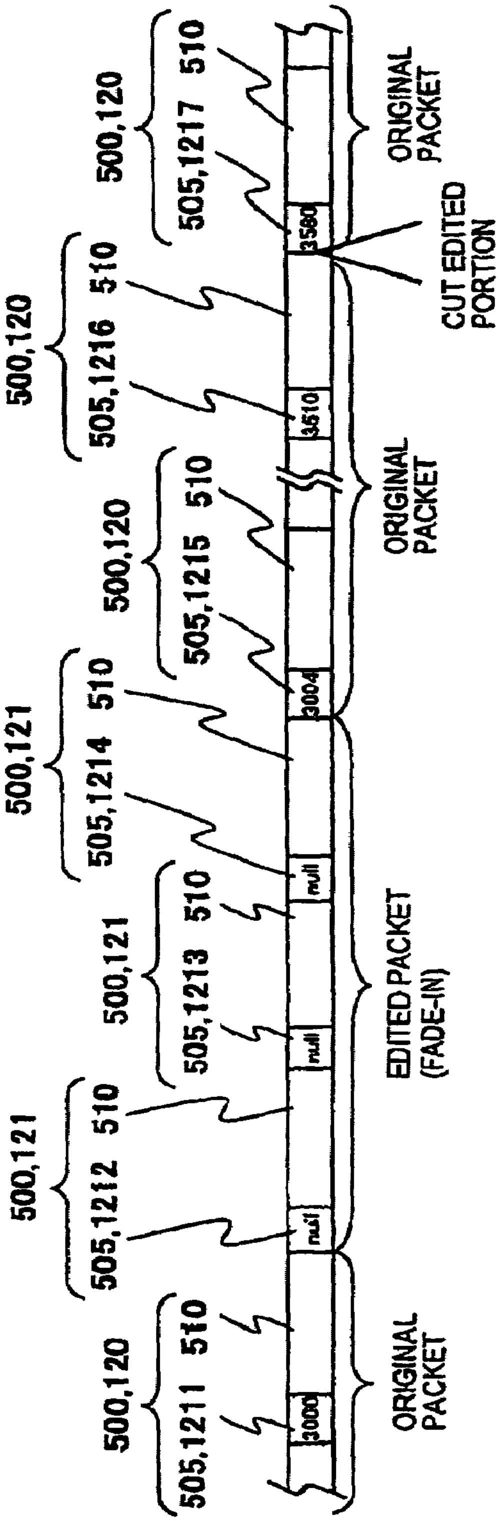
FIG. 12 is a diagram showing a packet of an edited music content of the second embodiment.

As shown in FIG. 12, the packets of the edited content contain original packets 120 which have not been subjected to any editing processing and edited packets 121 which have been subjected to the editing processing such as fade-in or the like. The respective packet numbers are stored in the headers 505 of the original packets 120. On the other hand, in place of the packet numbers, "null" is stored in the headers 1212 to 1214 of the edited packets 121.

In the case shown in FIG. 12, the edited content is different from the original content at the portion of three packets 121 which have been subjected to fade-in editing processing. Therefore, the packet numbers between the packet number "3000" held in the header 1211 of the packet 120 just before the three packets concerned and the packet number "3004" held in the header 1215 of the packet 120 just after the three packets concerned are missing. Further, the numbers between the packet numbers "3510" and "3580" held in the headers 1216, 1217 of the packets 120 before/after a portion which has been subjected to cut processing are missing. In order to restore the original content, the packets of the differential content are required to be inserted to the portions where the packet numbers are missing. In this embodiment, these packets of the differential content are obtained through the communication network, and the differential content thus obtained is merged with the edited music content to reconstruct the perfect content.

Subsequently, on the basis of a program table, the digital broadcast program managing unit 256 takes out a package managing table of the content from the packet managing table DB 870 at the broadcast time, and transmits the packet managing table through the digital broadcast transmission unit 252 to the digital broadcast network 280 (step 910). Thereafter, on the basis of the program table, the digital broadcast program managing unit 256 takes out from the packetized edited content DB 865 the music packets of the edited content as to which the broadcast time comes, and transmits the music packets through the digital broadcast transmission unit 252 to the digital broadcast network 280 (step 915).

The processing from step 920 to step 935 corresponds to data reception processing from the digital broadcast network 280 and reproducing processing of the received music data in the mobile unit reception terminal 200.

First, the digital broadcast reception unit 202 receives the packet managing table data distributed through the digital broadcast network 280, temporarily stores it into the packet managing table 805 (step 920), receives the packets of the music content distributed through the digital broadcast network 280 (step 925), and then temporarily stores the packets into the broadcast data buffer 204 (step 930). Subsequently, the audio reproducing unit 218 conducts the reproduction processing on the music content thus received and outputs the reproduced music content as music from the speaker 220.

The processing from step 940 to 945 corresponds to the processing when a user requests to purchase the music through the mobile unit reception terminal 200. When the user wants to purchase a piece of music while listening to the piece of music sounded from the speaker 220, the user can purchase his/her desired music content without inputting the title of the music or the like by merely inputting a purchase request button of the input unit 825. In this embodiment, the music content thus purchased is recorded in a recording medium which is detachably/attachably mounted on the recording device 920.

In this embodiment, the purchase request button is set as a software button displayed on the screen, and the press of the button is judged by sensing it through the touch sensor provided on the display screen whether the position corresponding to this button is touched or not. However, the present invention is not limited to this mode, and a hardware button may be provided in place of the software button. For example, the input unit 825 may be constructed as a remote controller having a purchase request button that is a hardware button.

Figure 14A:
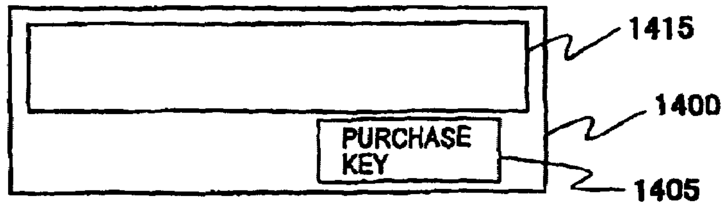
FIGS. 14A to 14F show music purchase processing display frames of the second embodiment.

In the initial state, a display frame 1400 shown in FIG. 14A is displayed on the display unit 830. Here, when the purchase request button 1405 is pressed and it is detected by the input unit 825 (step 940), the mobile unit reception terminal 200 advances the processing to step 945. In step 945, the reception terminal side data communication unit 206 transmits the user ID stored in the user ID managing unit 910 through the cellular phone communication network 285 to the content distribution station 100. On the other hand, if the purchase request button is not pressed within a predetermined time (step 940), the mobile unit reception terminal 200 returns the processing to the step 920.

The processing from step 950 to step 960 corresponds to the user authentication processing in the content distribution station 100. First, the distribution station side data communication unit 254 receives the user ID transmitted from the mobile unit reception terminal 200 (step 950), the user authentication unit 875 certifies the user ID (step 955), and then the distribution station side data communication unit 254 transmits the authentication result through the cellular phone communication network to the mobile unit reception terminal 200 (step 960). In this case, when the authentication succeeds, the user name is transmitted, and when the authentication fails, information on authentication failure is transmitted.

Figure 14B:
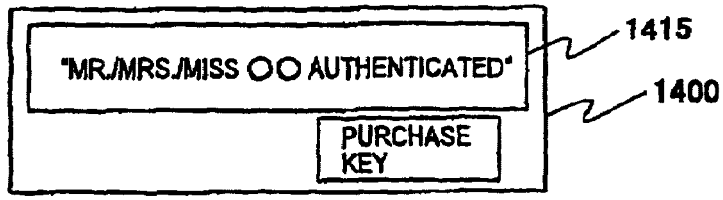

The processing from step 965 to step 975 corresponds to the processing of judging whether the authentication result is successful or not. First, the mobile unit reception terminal 200 receives the authentication result through the reception terminal side data communication unit 206 (step 965), and displays the authentication result on the display unit 830. In this embodiment, when the authentication succeeds, the user's name and the message indicating an authentication result that "Mr./Mrs./Miss OO is authenticated" are displayed in a message display area 1415 of a display screen 1400 as shown in FIG. 14B. Further, when the authentication fails, a message "authentication fails" is displayed.

Subsequently, the mobile unit reception terminal 200 judges whether the authentication result that is received in step 965 is successful or not. If the authentication succeeds, the processing goes to step 975. On the other hand, if the authentication fails, the processing goes back to step 920 (step 970).

The processing from step 975 to step 1010 corresponds to the processing of identifying the music packet lacking portion and the request processing to the content distribution station 100 in the mobile unit reception terminal 200. Here, the packet managing table will be described with reference to FIG. 13.

The packet managing table 1300 is prepared for every music content to be distributed, and is equipped with a content ID 1310 for specifying the content, a head packet number 1315 indicating the number of the head packet of the content, the last packet number 1320 indicating the number of the last packet of the content, and a packet managing table identifier 1305 which indicates that these data constitute the packet managing table.

Figure 13:
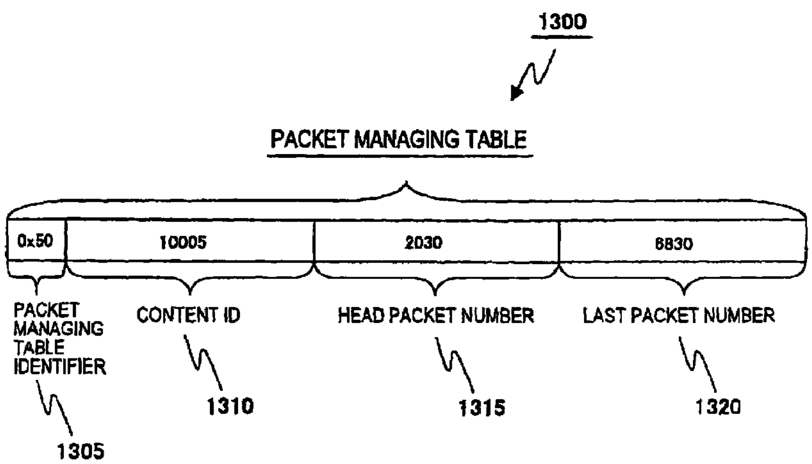
FIG. 13 is a diagram showing a packet management table of the second embodiment.

For example, in the case of FIG. 5, assuming that the packets from 500*a* to 500*d* constitute the music content 50 of a piece of music, the start packet number "2030" which is described as the start packet number 1315 in the header 505*a* of the start packet 500*a* and the last packet number "6830" which is described as the last packet number 1320 in the header 505*d* of the last packet 500*d* are described in the packet managing table of the content 50 as shown in FIG. 13. Further, a unique ID is allocated in the content ID 1310 to specify the music content 50 concerned.

First, in step 975, on the basis of the packet numbers described in the headers of the packets, the packet lacking portion identifying unit 212 detects a place at which the packet numbers are not serial to each other, that is, it detects a packet number of the differential content corresponding to a portion which has not been received or is different from the original due to a content editing and thus is required to restore the content. In this case, only the packets between the head packet number and the last packet number described in the packet managing table 805 are targeted as the differential content to be detected.

Subsequently, the reception terminal 200 advances the processing to step 1010 if no differential content is required. On the other hand, it advances the processing to step 1050 if any differential content is required (step 1005).

In step 1010, the differential packet request unit 214 transmits the packet numbers of the differential content detected in step 975 and the content ID described in the packet managing table 805 through the cellular phone communication network 285 to the content distribution station 100 by the reception terminal side data communication unit 206.

The processing from step 1015 to step 1025 corresponds to the processing of supplying the desired lacking packets for the differential packet request transmitted from the mobile unit reception terminal 200 in the content distribution station 100. First, the distribution station side data communication portion 254 receives the differential packet number and the content ID transmitted through the cellular phone communication network 285 (step 1015), the differential packet transmission managing unit 266 extracts a required packet from the packetized original content DB 855 on the basis of the packet number and the content ID (step 1020), and the distribution station side data communication unit 254 transmits the packet thus extracted through the cellular phone communication network 285 to the mobile unit reception terminal 200 (step 1025).

The processing from step 1030 to step 1045 corresponds to the processing of receiving the differential content transmitted from the content distribution station 100 through the cellular phone communication network 285 in the mobile unit reception terminal 200.

Figure 14C:
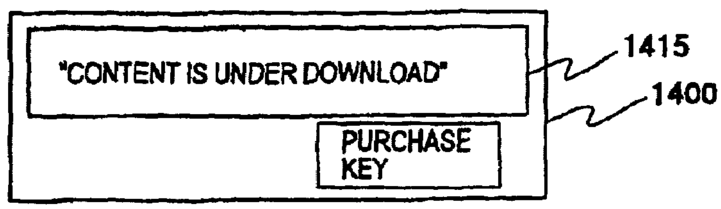

First, the reception terminal side data communication unit 206 receives the packets of the differential content (step 1030). At this time, the reception terminal 200 displays a message "content is under download" on the screen 1400 of the display unit 830 as shown in FIG. 14C.

Subsequently, the data communication unit 206 temporarily stores the packets of the differential content thus received into the communication data buffer 208 (step 1035). If the reception of the missing packets is completed, the data communication unit 206 advances the processing to step 1105, and the reception terminal side data communication unit 206 notifies the completion of the data reception to the content distribution station 100 through the cellular phone communication network 285 (step 1105). On the other hand, if the reception fails, the reception terminal 200 returns the processing to step 920 (step 1040).

The processing from step 1110 to step 1120 corresponds to the content charging processing in the content distribution station 100.

The distribution station side data communication unit 254 receives reception completion information transmitted from the mobile unit reception terminal 200 (step 1110), and the charging managing unit 880 carries out the charging processing of the content supplied to the user (step 1115).

The charging system of this embodiment may be a flat-rate based charging system such as a flat monthly rate, a flat yearly rate or the like, a charging system on an as-used basis which charges every piece of music, or a charging system on an as-used basis which charges in proportion to the data amount of the differential content transmitted. In this embodiment, the charging is made to the content itself, however, the present invention is not limited to this mode. For example, the content may be supplied at no charge, or some consideration other than money, such as points which have been given to a purchaser at the time of purchasing some other merchandise or the like, may be charged.

Subsequently, the charging managing unit 880 obtains from a merge permitting key managing unit 885 a merge permitting key indicating a permission of the merge between the music content distributed through the digital broadcast and the differential content supplied through the cellular phone communication network, and transmits the merge permitting key and the data of the amount charged in step 1115 through the cellular phone communication network 285 to the mobile unit reception terminal 200 by the distribution station side data communication unit 254 (step 1120).

The processing from step 1125 to step 1140 corresponds to merge processing and write-in processing for writing the content into a storage medium.

Here, a method of merging the music content received through the digital broadcast and the differential content received through the cellular phone communication network will be described. According to this embodiment, in the content restoring operation, for a content which has been subjected to editing such as fade-in, fade-out, cut, insertion of other sounds or the like, only the original data corresponding to a portion which has been subjected to such editing is requested and obtained through the communication network, and then the partial original data (differential content) thus obtained and the original data (music content) received through the broadcast are merged with each other thereby restoring the original music data.

Figure 15:
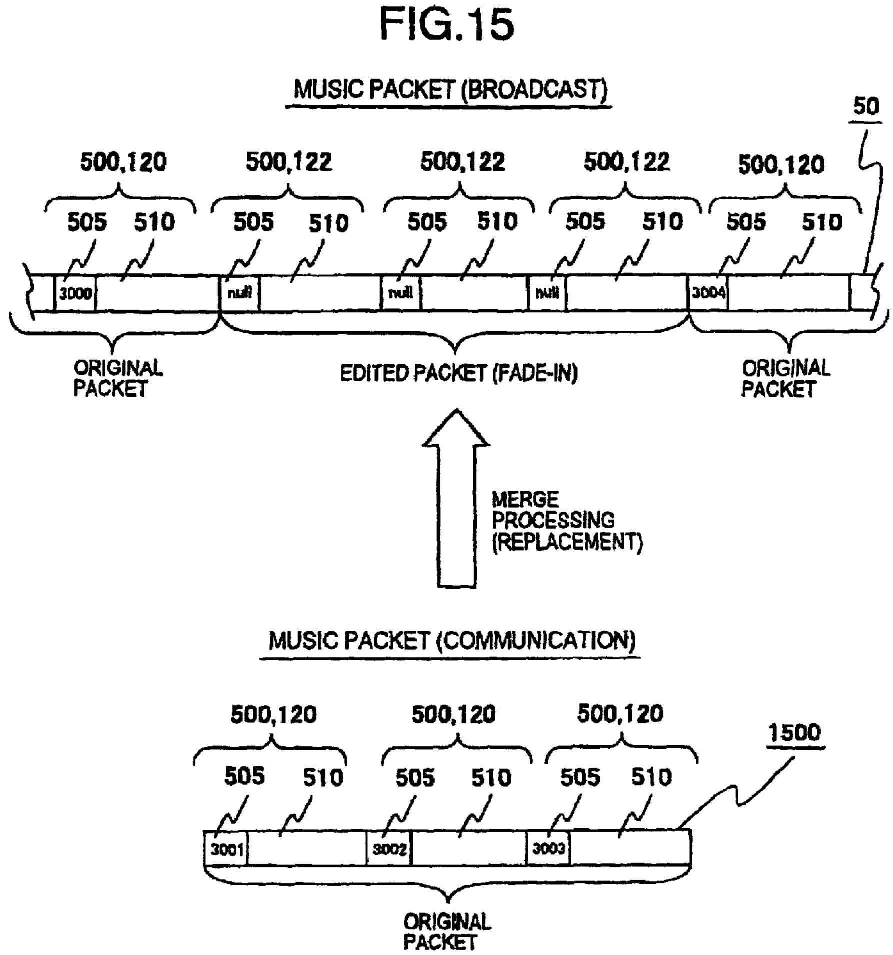
FIG. 15 is a diagram showing the merge processing (replacement operation) of the second embodiment.

For example, as shown in FIG. 15, when a packet 122 which has been subjected to a fade-in editing is contained in the music content 50 received through the digital broadcast, the reception terminal 200 obtains an original music packet 120 before editing corresponding to the edited packet 122 through the cellular phone communication network, and the edited packet 122 of the music content 50 is replaced with the original music packet 120 of the differential content 1500 obtained through the cellular phone communication network, whereby the music content is restored to the original state. The above processing will be hereinafter referred to as "replacement processing". The replacement processing is required to restore the portion subjected to an editorial process such as fade-in or fade-out where the original sound has been changed.

Figure 16:
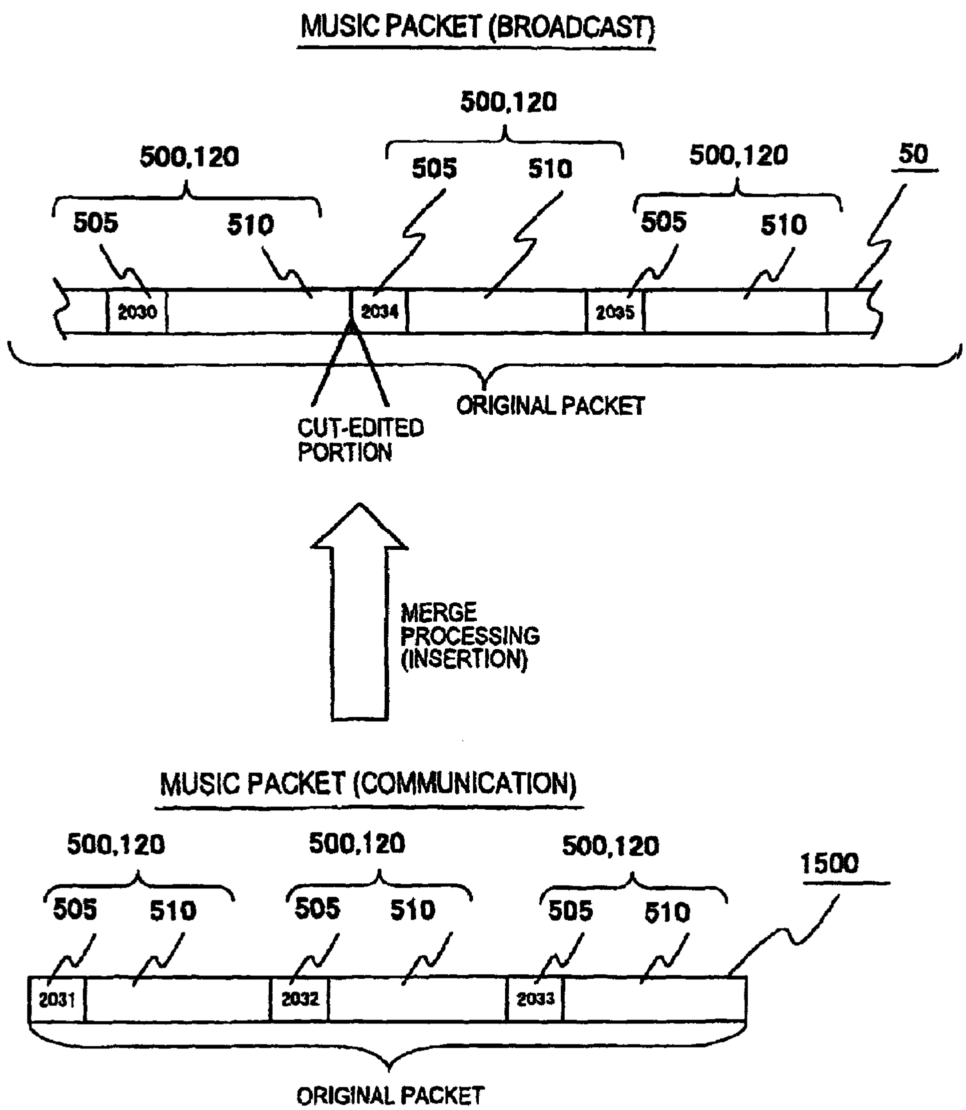
FIG. 16 is a diagram showing the merge processing (insertion operation) of the second embodiment.

Further, as shown in FIG. 16, when a portion which is cut out through a cut editing process exists in the music content 50 received through the digital broadcast, the reception terminal 200 obtains through the cellular phone communication network a group of packets 120 (differential content 1500) of the original music data corresponding to the cut-out portion, and inserts the original packet 120 of the differential content 1500 into the cut-processed portion of the music content 50, whereby the music content is restored to the original state before cut-editing. The above processing is referred to "insertion processing". When a part of the music is deleted due to cut or the like, the insertion processing is required to restore the editorially-processed portion.

Figure 14D:
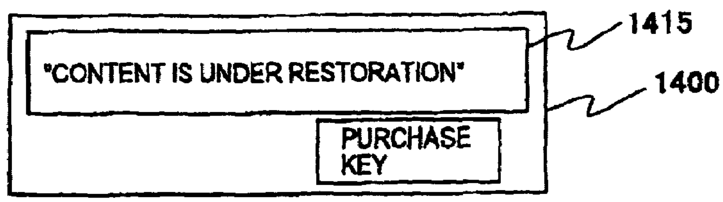

Subsequently, the reception terminal side data communication unit 206 receives the merge permitting key and the purchase amount information transmitted from the content distribution station 100, and delivers the merge permitting key to the merge permission managing unit 815 (step 1125). After the authentication processing of the merge permitting key is carried out by the merge permission managing unit 815 (step 1130), the content merge unit 216 merges the music content temporarily stored in the broadcast data buffer 204 with the differential content temporarily stored in the communication data buffer 208 to restore the music content, and stores the music content into the content storage unit 222 (step 1135). At this time, the content merge unit 216 displays a message "content is under restoration" on the screen 1400 of the display unit 830 as shown in FIG. 14D.

As shown in FIGS. 6, 15 and 16, through the merge processing, the music packets of the broadcast data buffer 204 and the music packets of the communication data buffer 208 are linked to each other so that the packet numbers described in the header portions 505 of the packets 500 become serial to each other.

If there is no differential content (that is, neither an edited portion nor a missing part exists in the music content), the content merge unit 216 stores the music content temporarily stored in the broadcast data buffer 204 into the content storage unit 222 without a merge processing in step 1135.

Figure 14E:
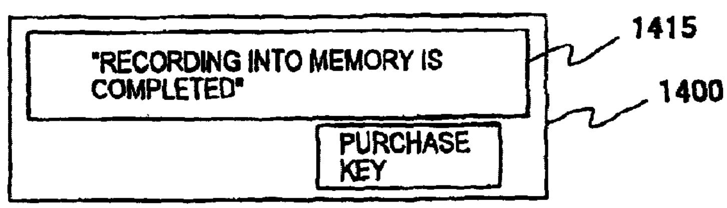
Figure 14F:
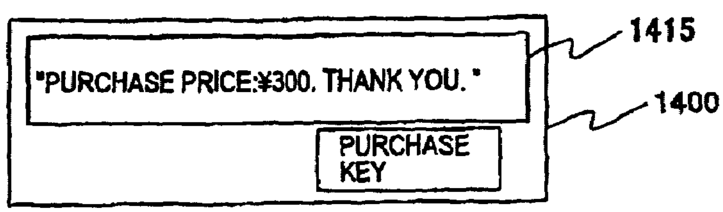

Finally, the reception terminal 200 reads out the music content thus restored from the content storage unit 222 and records it into a detachable/attachable type memory 820 (step 1140). Thereafter, a message "memory recording completed" is displayed on the screen 1400 of the display unit 830 as shown in FIG. 14E, a message "Purchase price: \300. Thank you." is displayed as shown in FIG. 14F, and then the processing is returned to step 920. In this embodiment, the purchase amount to be charged is displayed in step 1140, however, it may be displayed at any stage before the step 1140.

The program schedule in step 905 may be altered so that the purchase request frequency from the reception terminal 200 is stored every content and the number of distribution times (distribution frequency) of a content which is more frequently requested is increased in accordance with this purchase request frequency from the user. Further, as for the content that is requested at a higher purchase request frequency, the amount of the original portion of the music content to be distributed may be increased.

In the system of this embodiment, the user ID is allocated every individual user in advance and registered in the content distribution station 100. The reception terminal 200 of this embodiment accepts the input of the user ID in advance, and stores the user ID in the user ID managing unit 810, whereby cumbersome proceedings such as inputting a user ID, personal information, etc. can be avoided and a desired content can be easily and quickly obtained. However, the present invention is not limited to the above embodiments, and an input from the input unit 825 may be accepted every time the user ID is transmitted, and in place of the user ID, input of personal information such as the name or the like or selection of a charging method may be accepted. Further, in order to make user's identity sure, input of a password or the like may be accepted.

According to this embodiment, through the above processing, the user can purchase music in restoring the original music from the edited content having been distributed through the digital broadcast. This enables the user to greatly reduce the communication cost required to download the music content and obtain the music content in shorter time. Further, according to this embodiment, as in the case of the first embodiment, the perfect content can be obtained even if there is an interruption while the digital broadcast is received on the move.

While we have shown and described embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. An information distributing method comprising the steps of:
- dividing an original content into packets of original content;
- allocating a sequential serial number to each of the packets:
- storing the sequential serial number for a first packet and the sequential serial number for a last packet;
- broadcasting a broadcast content which is at least a part of the original content to a plurality of users;
- adding the sequential serial number to a non-edited packet in the content while adding an information indicating an edited packet for the packet of the edited content instead of adding the sequential serial number;
- transmitting the packet of original content excluding the packet corresponding to the sequential serial number received along with a download request as a differential content to reproduce the requested original content, when the download request of the broadcast content data is received from a reception terminal by a peer to peer communication.

2. The information distribution method as claimed in claim 1, wherein charging is carried out in accordance with transmission/reception of the differential content, or the data amount of the differential content.

3. The information distribution method as claimed in claim 1, wherein a frequency or a schedule of the broadcast is determined in accordance with a status of the request from said reception terminal.

4. The information distribution method as claimed in claim 1, wherein an amount or a ratio of packets containing a same data as the original content in the packets of the broadcast content is determined in accordance with a status of the request from said reception terminal.

5. An information reception method comprising the steps of:
- receiving a broadcast content that is at least a part of an original content transmitted from a content distribution station to a plurality of users by broadcast;
- receiving a download request for the original content from the users, the download request of the original content is performed by transmitting an ID of the broadcast content received and a serial number corresponding to the packet of original content to the content distribution station by peer to peer communication;
- receiving by peer to peer communication a differential content corresponding to the original content, the differential content transmitted in response to the download request; and
- merging the packets of original content being received as the broadcast contents and the packet of the differential contents to reproduce the original content.

6. The information reception method as claimed in claim 5, wherein the reception of the differential content is carried out through a cellular phone.

7. An information distribution system comprising an information distribution apparatus for distributing a content and a reception terminal for receiving the content, wherein said information distribution apparatus includes:
- a broadcast transmitting unit for transmitting a broadcast content which is at least a part of an original content to a plurality of users by broadcast, and a data communicating unit for transmitting a differential content which is at least a part of the original content to the reception terminal by peer to peer communication in response to a request for transmission of the broadcast content data from said reception terminal, and said reception terminal includes:

a broadcast receiving unit for receiving the broadcast content transmitted from the information distribution apparatus by the broadcast, a lacking portion identifier for detecting a missing/altered portion that is missing or altered due to editing in the broadcast content thus received;

a differential packet requesting unit for requesting retransmission of the missing/altered portion to said information distribution apparatus, a data communicating unit for transmitting the request to said information distribution apparatus by peer to peer communication and receiving the differential content corresponding to the missing/altered portion, which is at least a part of the original content, transmitted in response to the request; and a content merging unit for merging the broadcast content with the differential content to reproduce the original content.

8. An information distribution apparatus comprising:

a packetizer, the packetizer dividing an original content into packets of original content, and allocating a sequential serial number to each of the packets, the packetizer adding the sequential serial number to a non-edited packet in the content while adding an information indicating an edited packet for the packet of the edited content instead of adding the sequential serial number;

a database, the database storing the sequential serial number for a first packet and the sequential serial number for a last packet;

a broadcast unit, the broadcast unit broadcasting a broadcast content which is at least a part of the original content to a plurality of users; and a data communications unit, the data communications unit transmitting the packet of original content excluding the packet corresponding to the sequential serial number received along with a download request as a differential content to reproduce the requested original content, when the download request of the broadcast content data is received from a reception terminal by a peer to peer communication.

9. A reception terminal comprising:

a broadcast receiver for receiving a broadcast content which is at least part of an original content transmitted from an information distribution apparatus to a plurality of users by broadcast;

a data communications unit, the data communications unit receiving a download request for the original content from the users, the download request of the original content is performed by transmitting an ID of the broadcast content received and a serial number corresponding to the packet of original content to the information distribution apparatus by peer to peer communication, the data communications unit receiving by peer to peer communication a differential content corresponding to the original content, the differential content transmitted in response to the download request; and a content merging unit, the content merging unit merging the packets of original content being received as the broadcast contents and the packet of the differential contents to reproduce the original content.

10. The reception terminal as claimed in claim 9, further including a purchase button for accepting purchase of a received content during reproduction of the content.

11. The reception terminal as claimed in claim 10, further including a merge permission managing unit for permitting a merging processing.

12. An information distribution method comprising:

dividing an original contents into packets;

allocating a serial number indicating the original contents to each of the divided packets;

storing a first packet number and a last packet number;

adding a packet corresponding to portions subjected to editing with information that indicates editing instead of sequential serial number of the original content, at the time of contents distribution; and distributing via peer to peer communication the original packet corresponding to the sequential serial number not specified with respect to the information indicating editing provided in the request, when the download request is received after the contents distribution.

13. An information distributing method comprising:

transmitting a broadcast content, which is at least a part of an original content to a plurality of users by broadcast; and when the missing portion of the broadcast content thus transmitted is detected in a reception terminal, transmitting by peer to peer communication a differential content which is at least a part of the original content in response to a request for transmission of a missing portion transmitted from the reception terminal by peer to peer communication, wherein the differential content is differential data for reproducing the original content by being merged with the broadcast content, and wherein each of the broadcast content and the differential content contains at least some of packets which are obtained by dividing the original content into some pieces of data, the packets being added with serial codes corresponding to time sequence, and wherein no serial code is added to a packet containing data different from the original content, in the packets of the broadcast content, and wherein the differential content includes packets containing at least a part of data of the original content, the part of data corresponding to a missing part or an altered portion due to editing, in the broadcast content received by said reception terminal.

* * * * *